(Model.)

D. BAILEY.
BEE HIVE.

No. 283,554. Patented Aug. 21, 1883.

Witnesses.
Louis L. Gardner
J. W. Garner

Inventor.
Daniel Bailey
per
F. A. Lehmann,
Atty.

UNITED STATES PATENT OFFICE.

DANIEL BAILEY, OF BUCKEYE CITY, OHIO.

BEE-HIVE.

SPECIFICATION forming part of Letters Patent No. 283,554, dated August 21, 1883.

Application filed March 8, 1883. (Model.)

*To all whom it may concern:*

Be it known that I, DANIEL BAILEY, of Buckeye City, in the county of Knox and State of Ohio, have invented certain new and useful Improvements in Bee-Hives; and I do hereby declare the following to be a full, clear, and exact description of the invention, such as will enable others skilled in the art to which it pertains to make and use it, reference being had to the accompanying drawings, which form part of this specification.

My invention relates to an improvement in bee-hives; and it consists, first, in the combination of the brood-chamber, having inclined sides, with a board which is placed inside, and which is connected with the side door of the hive just above an opening, so that the moths in attempting to enter the hive will crawl up under the board and out of the opening at the side; second, in suitable slides which are placed between the inner ends of the brood and the honey chambers, and which can be removed for the purpose of attaching a honey-box without disturbing the bees, all of which will be more fully described hereinafter.

Figure 1:
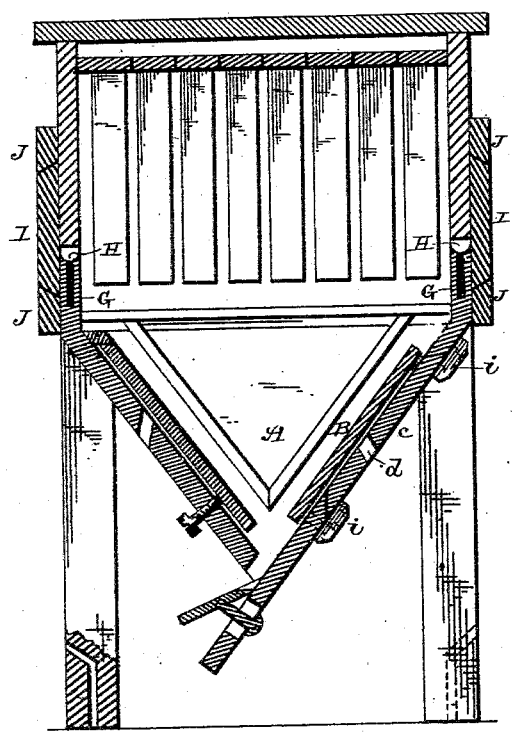
Figure 2:
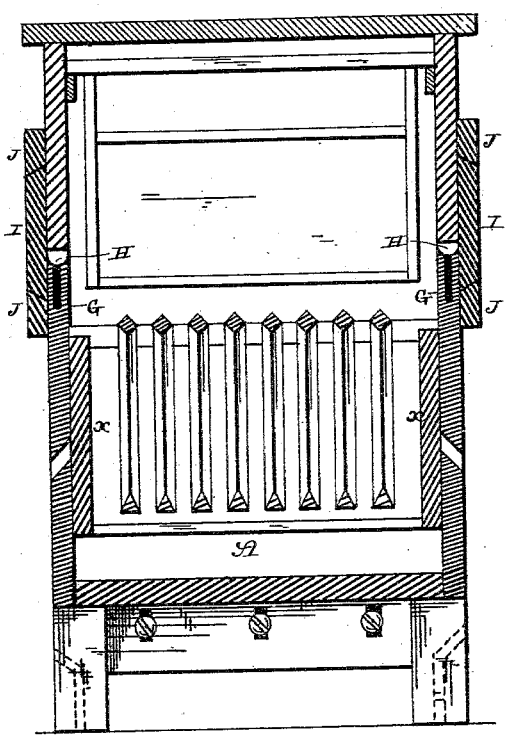

Figures 1 and 2 are vertical sections of my invention, taken at right angles to each other.

A represents the brood-chamber, which is made triangular in cross-section, as shown. Inside of this brood-chamber is placed the board B, which is secured at its upper end to the removable perforated piece c. The lower end of this board extends away from the side of the chamber far enough to allow moths and other such insects in entering the hive to pass up under it. Through the removable piece c, to which this board is attached, is made a slot, d, of any desired length, and through which the insects will pass out of the hive after once getting under the lower end of this board. This removable piece c serves as a door to give access to the lower part of the hive, and is held in place by the buttons i or other similar devices. When this door c is removed, it carries the board B with it, and then the brood-frames are left exposed. The lower edge of the board extends downward near enough to the lower opening to prevent any other insects than the bees from passing up over its lower edge. In removing the removable piece c at any time this board B is removed with it. As this removable piece is not quite as wide as the interior of the brood-chamber, small strips x are placed at each end of the board, so as to fill out the full width of the chamber. The bees, in entering the hive, fly directly up toward the frames, or climb over the lower end of the board; but the moths, when entering, climb up the inclined side of the chamber until they get under this board, when they are compelled to go on up and pass out of the opening above. The ends of the chamber may be made hollow in the same way, and provided with suitable openings into which the moths will go for the purpose of depositing their eggs, or through which they will escape after having climbed up inside of the chamber. By means of the construction here shown an almost perfect protection against moths is formed. This brood-chamber will be filled with triangular frames in the usual manner. The top of this chamber extends any suitable distance upward above the tops of the frames, and in the top edge of the flanges G thus formed is made a trough, H, in which food may be placed for the bees; or the troughs may be filled with salt for the purpose of keeping away obnoxious insects. The lower end of the honey-chamber, which may be of any desired construction, does not rest solidly upon the top of this brood-chamber, but is held any suitable distance above it by means of the four slides I, which are held in place by means of the dovetailed cleats J, which are secured to the outer sides of both chambers. These slides form tight joints around the inner ends of both sections of the hive; but any one of them may be removed at any time, for the purpose of attaching a honey-chamber in its place. The chambers will be so formed at their inner edges that they will catch in behind the edges of the cleats in the same manner as the slides, and as they can be almost instantly removed and replaced there is no danger of troubling the bees. Either one or more honey-chambers, as desired, may be attached, and they will be supported in position entirely between the two sections of the hive.

In the bottoms of the legs of the hive will be made suitable holes, as shown, in which salt will be placed for the purpose of keeping away insects from the hive. In the top of each of the boards in which the troughs are made will be bored holes, in which salt can also be placed to keep away insects.

Having thus described my invention, I claim—

1. In a hive, the combination of the brood-chamber having inclined sides, a raised board which is placed inside of the hive, and the removable perforated piece c, to which the board is secured, substantially as described.

2. In a hive, the combination of the brood-chamber A, having the troughs H formed in its edges, with the upper portion of the hive, the cleats J, and the slides I, substantially as shown.

3. The combination of a brood-chamber, a honey-chamber placed thereon, and suitable slides, which are placed between the two chambers, so as to support the honey-chamber, substantially as specified.

In testimony whereof I affix my signature in presence of two witnesses.

DANIEL BAILEY.

Witnesses:
WILLIAM BURRIS,
SILAS SHRIMPLIN.